(12) United States Patent
Eszterle et al.

(10) Patent No.: US 10,520,105 B2
(45) Date of Patent: Dec. 31, 2019

(54) SPOOL VALVE, IN PARTICULAR FOR AN AUTOMATIC TRANSMISSION OF A MOTOR VEHICLE

(71) Applicant: Robert Bosch GmbH, Stuttgart (DE)

(72) Inventors: Marcel Eszterle, Tamm (DE); Klaus Schudt, Nordheim (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 15/029,229

(22) PCT Filed: Aug. 26, 2014

(86) PCT No.: PCT/EP2014/068038
§ 371 (c)(1),
(2) Date: Jul. 6, 2016

(87) PCT Pub. No.: WO2015/055340
PCT Pub. Date: Apr. 23, 2015

(65) Prior Publication Data
US 2016/0305566 A1    Oct. 20, 2016

(30) Foreign Application Priority Data
Oct. 18, 2013    (DE) ........................ 10 2013 221 218

(51) Int. Cl.
*F16K 31/06* (2006.01)
*F16K 27/04* (2006.01)
(Continued)

(52) U.S. Cl.
CPC ....... *F16K 27/041* (2013.01); *F16H 61/0251* (2013.01); *F16K 11/07* (2013.01); *F16K 31/0613* (2013.01); *F16H 2061/0253* (2013.01)

(58) Field of Classification Search
CPC .... F16K 27/041; F16K 11/07; F16K 31/0613; F16H 2061/0253
(Continued)

(56) References Cited

U.S. PATENT DOCUMENTS 6,296,019 B1 * 10/2001 Muller ................ F16F 15/1207
                                                      137/625.66
6,556,113 B2    4/2003 Ketschau et al.
(Continued)

FOREIGN PATENT DOCUMENTS

| DE | 3224119 A1 | 12/1983 |
|---|---|---|
| DE | 19847021 A1 | 4/2000 |
| DE | 20100950 U1 | 5/2002 |

OTHER PUBLICATIONS

Translation of DE 19847021 A1; Brehm et al.; Apr. 20, 2000.*
International Search Report dated Oct. 30, 2014 for International Application No. PCT/EP2014/068038.

*Primary Examiner* — Marina A Tietjen
*Assistant Examiner* — Paul J Gray
(74) *Attorney, Agent, or Firm* — Norton Rose Fulbright US LLP; Gerard Messina

(57) ABSTRACT

A spool valve, for a motor vehicle's automatic transmission, having a housing and an axially movable valve spool in a guide recess of the housing, including at least one radial inlet connection and one radial outlet connection spaced axially apart therefrom, and a working connection on the front face, at least one first control opening connected to the inlet connection and one second control opening spaced axially apart therefrom and connected to the outlet, and one third control opening situated axially between these two and connected to the working connection being present on the guide recess, the control openings being hydraulically cooperate-able with one first and second control section on the valve spool, and a connection channel extending axially in (Continued)

sections being in the housing, connecting the third control opening to the working connection. The housing includes a section made of plastic, in which the connection channel is formed.

14 Claims, 4 Drawing Sheets

(51) Int. Cl.
*F16K 11/07* (2006.01)
*F16H 61/02* (2006.01)

(58) Field of Classification Search
USPC .................................. 137/625.67, 625.69
See application file for complete search history.

(56) References Cited

U.S. PATENT DOCUMENTS

| 2003/0226593 | A1* | 12/2003 | Okada | F01M 11/03 |
| | | | | 137/550 |
| 2012/0048398 | A1* | 3/2012 | Schudt | F16K 31/0613 |
| | | | | 137/514 |
| 2012/0111296 | A1* | 5/2012 | Hoppe | F01L 1/344 |
| | | | | 123/188.4 |
| 2012/0326062 | A1 | 12/2012 | Wieland et al. | |

\* cited by examiner

SPOOL VALVE, IN PARTICULAR FOR AN AUTOMATIC TRANSMISSION OF A MOTOR VEHICLE

FIELD OF THE INVENTION

The present invention relates to a spool valve.

BACKGROUND INFORMATION

Automatic transmissions for motor vehicles are believed to be available, which use hydraulically actuatable clutches for changing gears. A comparatively high precision of the hydraulic components is required in order for gear shifts to proceed smoothly and unnoticeable to the driver. Electromagnetically actuatable pressure control valves, for example, are used for such purposes. Patent publications from this technical field include, for example, DE 198 47 021 B4 and DE 201 00 950 U1.

SUMMARY OF THE INVENTION

The problem underlying the present invention may be solved by a spool valve as described herein. Advantageous refinements are specified in the further descriptions herein. Features important for the present invention are also found in the following description and in the drawings, whereby the features may be important to the present invention, both alone and in different combinations, without further reference being explicitly made hereto.

The present invention relates to a spool valve, which may be used, in particular, as a pressure control valve for an automatic transmission of a motor vehicle, having a housing with an axially movable valve spool situated in a guide recess of the housing. The housing in this case includes at least one radial inlet connection and one radial outlet connection spaced axially apart therefrom and one working connection on a front face, at least one first control opening connected to the inlet connection and one second control opening spaced axially apart therefrom and connected to the outlet connection, and one third control opening situated axially between these two and connected to the working connection being present at the guide recess, the first and second control openings being capable of hydraulically cooperating with one first and one second control section on the valve spool, and a connection channel extending axially in sections being present in the housing, which connects the third control opening to the working connection. According to the present invention, the housing has a section made of plastic, in which the connection channel is formed.

In this way, the spool valve may be particularly cost-effectively manufactured, permitting a comparatively large hydraulic cross-section in the connection to the working connection on the front face. An external hydraulic connection to the working connection and an additionally required hydraulic connection on the housing of the spool valve, are in particular, unnecessary. It is also unnecessary for the valve spool to include an axial and/or radial channel, which would have to be implemented with the aid of a centrical or radial bore. Thus, the spool valve according to the present invention makes comparatively large hydraulic flows and, therefore, good dynamic behavior possible.

In one embodiment of the present invention, the housing includes a spool sleeve that may be made of metal, in which the guide recess and the control openings are formed, and which is extrusion-coated with plastic, whereby the section made of plastic is formed. As a result, the spool valve may be manufactured in a particularly simple and nevertheless robust manner and a weight of the spool valve may be reduced. A chipping volume required for manufacturing the spool valve is comparatively small, thereby lowering costs. Internal recesses and/or milled channels on an outer diameter of the spool sleeve are unnecessary. Plastic injection molded parts are also particularly inexpensive to manufacture.

It may also be provided that the housing includes a radial outer shell element, which is press-fitted onto the section made of plastic, and on which the inlet connection, the outlet connection and the working connection are formed. With the aid of press-fitting, it is possible to assemble the spool valve in a particularly simple manner. The respective press connections take place, in particular, on radially enclosed annular surfaces between the housing and the outer shell element, thereby facilitating a great hydraulic tightness. In addition, the shell element is easily mountable and with no specific angle orientation.

Additionally, it may be provided that the shell element includes at least one filter screen assigned to a connection. For example, the filter screen is formed on the front face of the shell element and is therefore assigned to the working connection. As the case may be, an external filter is thus unnecessary, whereby costs may be saved. The shell element may also be an injection molded part, into which the filter may be incorporated during injection molding.

In another embodiment of the spool valve, the valve spool has an essentially identical diameter in a respective area of the first and second control section on the spool side, and is therefore configured essentially with a non-incremental diameter. In this way, the manufacture of the valve spool and also the spool sleeve may be simplified and at reduced costs.

It may further be provided that the connection channel includes at least two axially extending sub-channels, which are situated at a radial angle of 90 degrees relative to at least one of the radial connections of the spool valve. The sub-channels are formed with the aid of recesses and/or cavities in the section made of plastic. This allows for a comparatively large hydraulic cross-section of the connection channel, and thereby improves the operation of the spool valve. For example, at least sections of the axial sub-channels have an approximately circular segment-shaped or crescent-shaped cross section. This results in a cross sectional shape for the connection channel extending axially in sections, which is particularly suited for the spool valve according to the present invention.

The spool valve may be particularly and precisely operated if it is electromagnetically actuatable, where the valve spool may be axially acted upon by an axially operating compression spring on the one hand and by electromagnetic force on the other hand. Thus, a respective force equilibrium between the spring force and the electromagnetic force—taking into account possible hydraulic forces—determines an axial position of the valve spool in the spool sleeve.

Exemplary embodiments of the present invention are explained below with reference to the drawings.

The same reference numerals are used in all figures, as well as in different specific embodiments, for functionally equivalent elements and variables.

DETAILED DESCRIPTION

Figure 1:
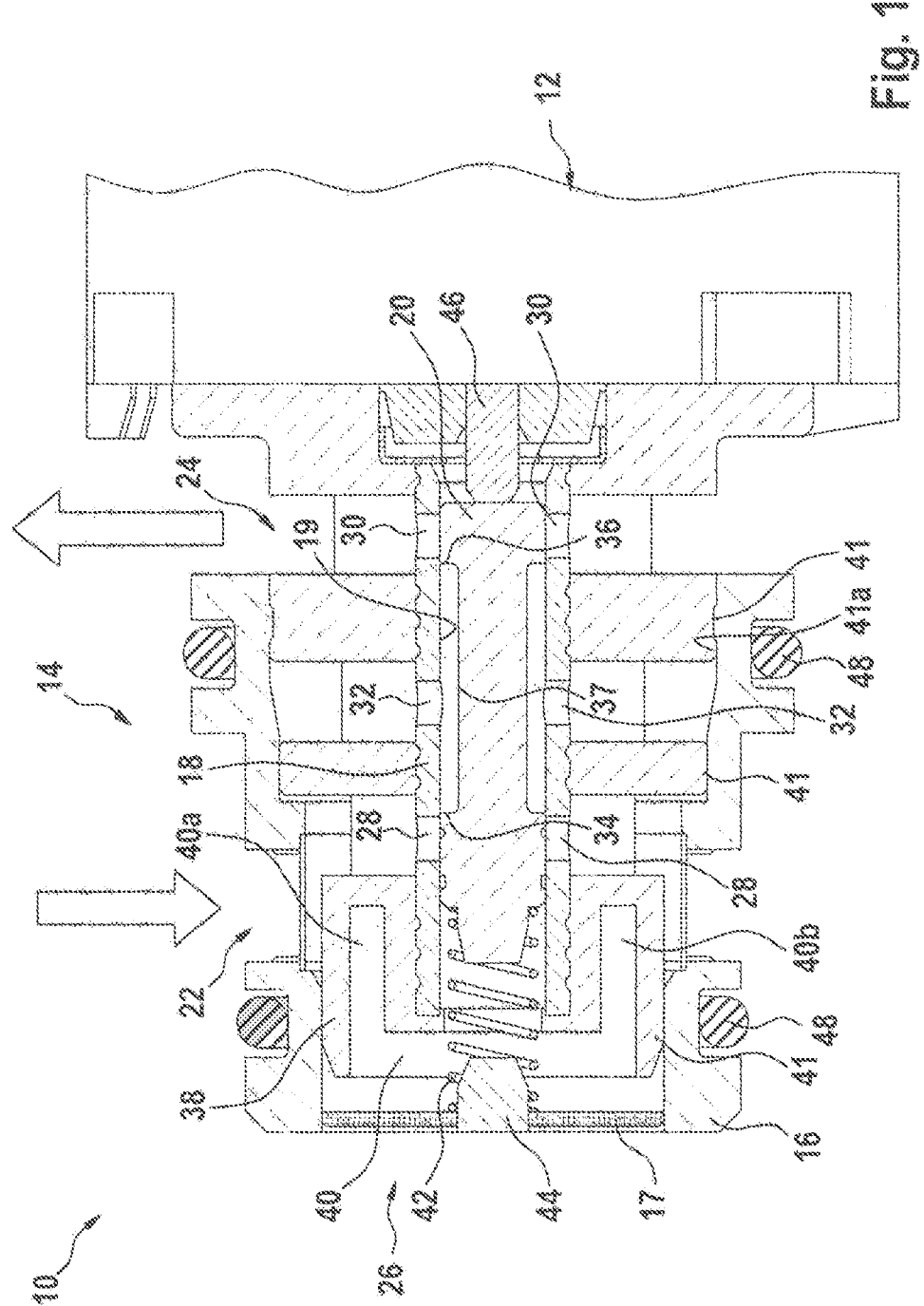
FIG. 1 shows a first axial sectional view of a spool valve for an automatic transmission of a motor vehicle.

FIG. 1 shows an axial sectional view of a spool valve 10 for an automatic transmission (not shown) of a motor vehicle. An electromagnetic actuator 12 actuating spool valve 10 is depicted in a partial exterior view in an area to the right in FIG. 1.

Spool valve 10 includes a housing 14 having an approximately hat-shape configured, radially outer shell element 16, which is a plastic injection molded part. A filter screen 17 is situated on the front face (i.e., to the left in FIG. 1) of the outer shell element 16. Filter screen 17 is injection-molded into shell element 16. Housing 14 also includes an essentially cylindrically formed spool sleeve 18, on which a guide recess 19 is formed radially inside extending approximately over the entire axial length of spool sleeve 18. A valve spool 20 is axially movable and guided essentially fluid-tight in guide recess 19.

Housing 14 also includes a radial inlet connection 22 and a radial outlet connection 24 spaced axially apart therefrom, as well as working connection 26 on the front face, which is situated on the spool valve 10 to the left in FIG. 1. Inlet connection 22, outlet connection 24 and working connection 26 are formed, in particular, on radially outer shell element 16.

Two arrows (without reference numerals) mark a potential flow direction at inlet connection 22 and at outlet connection 24.

Four first control openings 28 connected to inlet connection 22 and four second control openings 30 spaced axially apart from the former and connected to outlet connection 24, and four third control openings 32 situated axially between first and second control openings 28 and 30 and connected to working connection 26, are distributed uniformly in the circumferential direction on spool sleeve 18 and on guide recess 19. Only two each of control openings 28 and 30 and 32 are visible in FIG. 1 due to the present sectional view. The remaining respective two each control openings 28 and 30 and 32 are visible in FIG. 2 described further below. The respective four control openings 28 and 30 and 32 are situated at an angle of 90 degrees radially to one another.

First and second control openings 28 and 30 may each cooperate hydraulically with one first and one second control section 34 and 36 on valve spool 20, each including a circumferential control edge on the spool side. Valve spool 20 has, in particular, an essentially identical diameter in a respective area of first and second control section 34 and 36 on the spool side. Valve spool 20 has a radially circumferential recess 37 extending axially between control sections 34 and 36. Housing 14 also includes a radial middle section 38 situated radially between spool sleeve 18 and outer shell element 16. Outer shell element 16, radial middle section 38, spool sleeve 18 may be made of metal and valve spool 20 are each configured at least partially rotationally symmetrical.

A connection channel 40, which extends axially in sections and hydraulically connects third control openings 32 with working connection 26, is formed in radial middle section 38. Connection channel 40 includes one first and one second axial sub-channel 40a and 40b, which are situated radially offset from one another by 180 degrees, as will be shown further below in FIGS. 2 and 3. Sub-channels 40a and 40b are also situated at a radial angle of 90 degrees relative to radial connections 22 and 24 of spool valve 10.

In the present example, radial middle section 38 is made of plastic as a result of the (mostly metallic) spool sleeve 18 being extrusion-coated with plastic. In addition, spool sleeve 18 has a plurality of axially distributed, radially circumferential outer grooves or ribs (without reference numerals), so that both elements are interlocked as the case may be and form one unit. Radial middle section 38 in the present example is compressed on three radially outer sections 41 spaced axially apart against corresponding radially inner sections of outer shell element 16, resulting in a force-fitting connection of both elements to one another. Radially outer sections 41 may—as in the present example—also have at least one radially circumferential link 41a, whereby the compression against the radially outer shell element 16 is improved and the tightness is therefore also increased.

A compression spring 42 configured as a coil spring engages a conically configured end section (without reference numeral) of valve spool 20 to the left in the drawing. An opposing axial section of compression spring 42 is retained on a centrical section 44, also conically configured, of outer shell element 16. Thus, compression spring 42 is able to apply a pressure force on valve spool 20, to the right in the drawing. This pressure force acts together with the hydraulic force, which arises in working connection 26 due to application to the front surface, to the left in the drawing, with the pressure present there. A front surface of valve spool 20, to the right in the drawing, is acted upon by an actuating pin 46 of electromagnetic actuator 12.

Spool valve 10 further includes two annular O-ring seals 48 situated in radially circumferential outer grooves of outer shell element 16, which are able to hydraulically seal outlet connection 24 from inlet connection 22 and inlet connection 22 from working connection 26 in the assembled state of spool valve 10.

During the manufacture of spool valve 10, radial control openings 28, 30 and 32 of spool sleeve 18 may be held open in an injection molding tool with the aid of tool jaws. Between control openings 28 and 32 and between 32 and 30, the plastic forms circular areas, which are used as sealing points for sealing off inlet connection 22 from working connection 26 and working connection 26 from outlet connection 24. Additional sealing points result—as described above—with the aid of the press-fit connections between radial middle section 38 and radially outer shell element 16.

Valve spool 20 is positioned in FIG. 1 in such a way that first control openings 28 of inlet connection 22 are closed with the aid of second control section 34 and second control openings 30 of outlet connection 24 are closed with the aid of second control section 36. Third control openings 32, which are hydraulically connected to working connection 37, are connected to a fluid chamber formed by radial recess 37 on valve spool 20, but, based on the position of valve spool 20 depicted in FIG. 1, are not hydraulically connected to inlet connection 22 or outlet connection 24.

During operation of spool valve 10 of FIG. 1, valve spool 20 may, in principle, be moved axially continuously in guide recess 19 of spool sleeve 18 as a function of an actuation force of electromagnetic actuator 12 and as a function of a force of compression spring 42. In a first position of valve spool 20 (valve spool 20 being moved to the left relative to the depiction in FIG. 1), inlet connection 22 and working connection 26 are hydraulically connected to one another. This results in a hydraulic connection as follows: from inlet connection 22 through first control openings 28, then through radial recess 37 on valve spool 20, then through third control openings 32, then through the two sub-channels 40a and 40b, then through filter screen 17 and toward working connection 26.

In a second position of valve spool 20 (as drawn in FIG. 1 and described above), working connection 26 is separated hydraulically from inlet connection 22 and outlet connection 24. In a third position of valve spool 20 (valve spool 20 being moved to the right relative to the depiction of FIG. 1), outlet connection 24 and working connection 26 are hydraulically connected to one another. This results in a hydraulic connection as follows: from working connection 26 through filter screen 17, then through sub-channels 40a and 40b, then through third control openings 32, then through radial recess 37 on valve spool 20, then through second control openings 30 and toward outlet connection 24.

Figure 2:
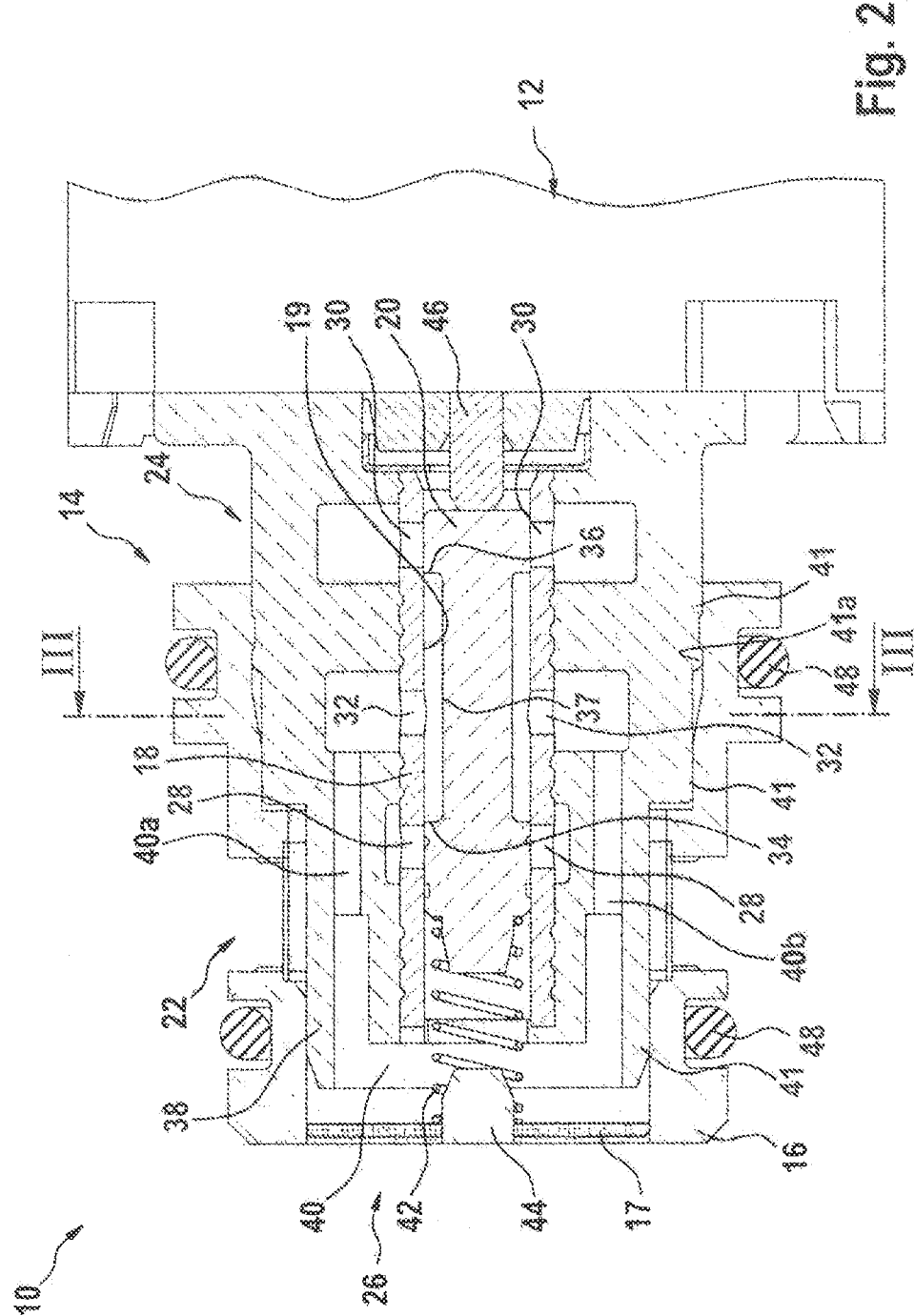
FIG. 2 shows a second axial sectional view of the spool valve of FIG. 1.

FIG. 2 shows spool valve 10 in a second axial sectional view, which is rotated radially by 90 degrees relative to the first axial sectional view of FIG. 1. An axial progression in sections of the two sub-channels 40a and 40b of connection channel 40 is particularly apparent. Valve spool 20 is situated in an axial position identical to that of FIG. 1.

Figure 3:
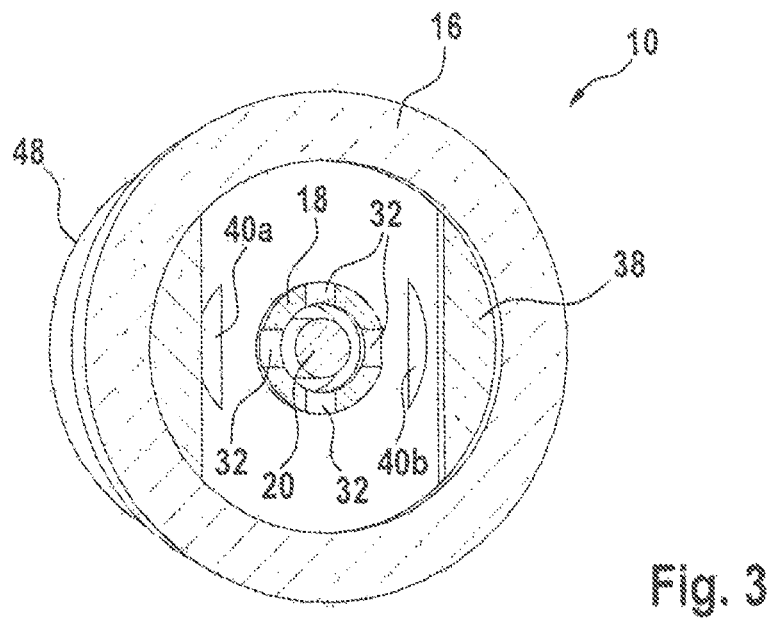
FIG. 3 shows a perspective representation of a radial section through the spool valve along a line III-III of FIG. 2.

FIG. 3 shows a perspective representation of a radial section through spool valve 10 along a line III-III of FIG. 2, i.e., centrally through the four radial control openings 32 of spool sleeve 18. In the sectional plane depicted, axial sub-channels 40a and 40b have a circular segment-like cross section. In a specific embodiment of spool valve 10 not depicted, sections of axial sub-channels 40a and 40b have a crescent-shaped cross section.

Figure 4:
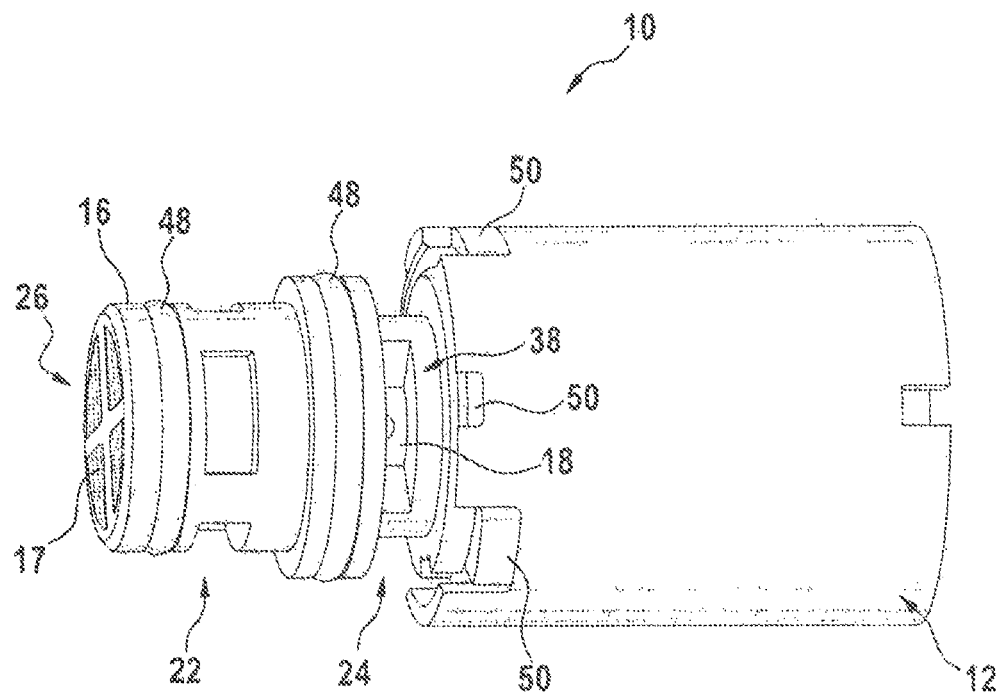
FIG. 4 shows a first perspective representation of the spool valve.

FIG. 4 shows a perspective representation of spool valve 10 according to FIGS. 1 through 3. Filter screen 17, which is retained with the aid of two links (without reference numerals) arranged in the shape of a cross, or includes two links arranged in a cross, is in particular, apparent in an extreme left section of the drawing. In a middle section of FIG. 4, it is apparent that radial middle section 38 includes a plurality of moldings 50, with the aid of which this section is situated at recesses of a housing (without reference numerals) of electromagnetic actuator 12.

Figure 5:
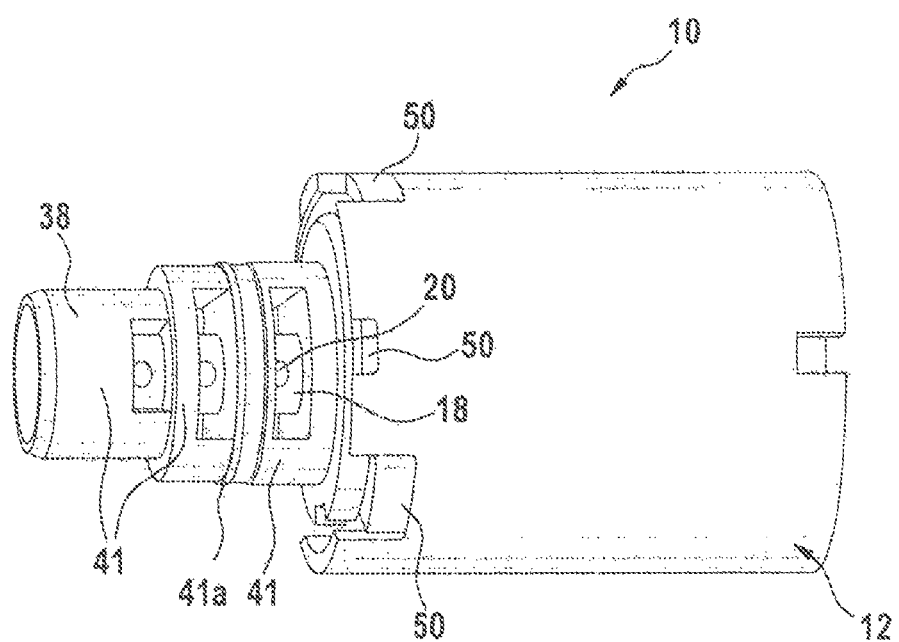
FIG. 5 shows a second perspective representation of the spool valve.

FIG. 5 shows another perspective representation of spool valve 10. In contrast to FIG. 4, radial outer shell element 16 was omitted in the drawing of FIG. 5, so that radial middle section 38 and spool sleeve 18 and valve spool 20 are more easily identified.

What is claimed is:

1. A spool valve, comprising:
    a housing;
    an axially movable valve spool situated in a guide recess of the housing;
    wherein the housing includes at least one radial inlet connection and one radial outlet connection spaced axially apart therefrom, and a working connection on a front face of the housing, at least one first control opening connected to the inlet connection and one second control opening spaced axially apart therefrom and connected to the outlet connection, and one third control opening situated axially between these two and connected to the working connection being present on the guide recess, the first control opening and the second control opening being respectively in fluidic connection with one first control section and one second control section on the spool valve, and a connection channel extending axially in sections being present in the housing, which connects the third control opening to the working connection,
    wherein the housing includes a section made of plastic, in which the connection channel is formed, wherein the housing includes a spool sleeve, in which the guide recess and the control openings are formed, and which is injection-molded with plastic, so that the section made of plastic is formed,
    wherein the connection channel includes at least two axially extending sub-channels, which are situated at a radial angle of 90 degrees relative to at least one of the radial connections of the spool valve, each sub-channel extending as respective bores through a material of the housing, and
    wherein each of the at least two axially extending sub-channels extends into the housing so that an axis of the radial inlet connection that is perpendicular to a longitudinal axis of the guide recess intersects each of the sub-channels.

2. The spool valve of claim 1, wherein the radial outer shell element, which is press-fitted onto the section made of plastic, and on which the inlet connection, the outlet connection and the working connection are formed.

3. The spool valve of claim 2, wherein the shell element includes at least one filter screen assigned to the working connection.

4. The spool valve of claim 1, wherein the valve spool has an identical diameter in a respective area of the first control section and the second control section on the spool side.

5. The spool valve of claim 1, wherein at least sections of the axial sub-channels have a circular segment-shaped or crescent-shaped cross section.

6. The spool valve of claim 1, wherein the spool valve is electromagnetically actuatable, the valve spool being actable upon axially by an axially operating compression spring and by electromagnetic force.

7. The spool valve of claim 1, wherein the spool sleeve is made of metal.

8. The spool valve of claim 1, wherein the spool valve is for an automatic transmission of a motor vehicle.

9. The spool valve of claim 1, wherein the valve spool includes a radially circumferential recess located between the first control section and the second control section of the valve spool, wherein a diameter of the radially circumferential recess is less than that of the first control section and the second control section.

10. The spool valve of claim 2, wherein:
    the housing includes a radial middle section disposed in an interior of the housing, wherein the radial middle section is disposed between the spool sleeve and the outer shell element.

11. The spool valve of claim 6, further comprising:
    an end section located at the front face and disposed distally of a distal end of the valve spool, wherein a first end of the compression spring engages the distal end of the valve spool and a second end of the compression spring engages the end section.

12. The spool valve of claim 11, further comprising:
    an actuating pin that is adapted to act upon a proximal end of the valve spool.

13. The spool valve of claim 1, wherein:
    the housing includes a radial outer shell element,
    the radial outer shell element includes the front face, and
    the working connection and the front face are located distally from the inlet and outlet connections, along a longitudinal axis of the radial outer shell element.

14. The spool valve of claim 1, wherein the sections of the connection channel includes a first section and a second section, the first section having a width that is larger than a width of the second section.

\* \* \* \* \*